(12) United States Patent
Kim (10) Patent No.: US 7,171,327 B2
(45) Date of Patent: *Jan. 30, 2007

(54) TEMPERATURE SENSOR SCHEME

(75) Inventor: Jung Pill Kim, Cary, NC (US)

(73) Assignee: Infineon Technologies AG, Munich (DE)

( * ) Notice: Subject to any disclaimer, the term of this patent is extended or adjusted under 35 U.S.C. 154(b) by 60 days.

This patent is subject to a terminal disclaimer.

(21) Appl. No.: 10/808,190

(22) Filed: Mar. 24, 2004

(65) Prior Publication Data

US 2005/0216220 A1 Sep. 29, 2005

(51) Int. Cl.
*G01K 1/00* (2006.01)
*G01K 17/00* (2006.01)
(52) U.S. Cl. ..................... 702/130; 702/136
(58) Field of Classification Search ......... 702/130, 702/136, 133, 64, 65
See application file for complete search history.

(56) References Cited

U.S. PATENT DOCUMENTS

| | | | |
|---|---|---|---|
| 3,924,470 A | 12/1975 | Sander | |
| 4,213,125 A * | 7/1980 | Watanabe | 345/39 |
| 4,395,139 A | 7/1983 | Namiki et al. | |
| 5,351,013 A * | 9/1994 | Alidio et al. | 330/284 |
| 6,002,627 A | 12/1999 | Chevallier | |
| 6,612,738 B2 | 9/2003 | Beer et al. | |
| 6,934,645 B2 * | 8/2005 | Kim | 702/64 |

OTHER PUBLICATIONS

A copy of PCT International Search Report for International Application No. PCT/EP2005/001790 mailed on Jun. 6, 2005 (6 pages).

* cited by examiner

*Primary Examiner*—Michael Nghiem
*Assistant Examiner*—Meagan S Walling
(74) *Attorney, Agent, or Firm*—Dicke, Billig & Czaja, PLLC (57) ABSTRACT

A temperature sensing circuit, and method of using the same. A temperature sensing circuit includes a comparator, a temperature reference circuit and trimmer. The comparator is configured to receive a sense voltage that is indicative of a sensed temperature. The temperature reference circuit has a plurality of reference voltages coupled to the comparator such that the plurality of reference voltages are alternately compared to the sense voltage. The trimmer is coupled to the temperature reference circuit and is independently adjustable to adjust the plurality of reference voltages.

21 Claims, 5 Drawing Sheets

TEMPERATURE SENSOR SCHEME

CROSS REFERENCE TO RELATED APPLICATIONS

This Utility Patent Application is related to commonly assigned Utility Patent Application Ser. No. 10/672,246, filed Sep. 25, 2003, entitled "TEMPERATURE SENSOR SCHEME," which is herein incorporated by reference.

BACKGROUND

The present invention relates to a temperature sensing circuit for sensing temperature. Specifically, the temperature sensing circuit utilizes a individually adjustable comparator to determine temperature.

In memory storage devices, densities are steadily increasing and chip areas are being reduced. In addition, operating frequencies are continually increasing. As a result, the energy density introduced into the semiconductor material of the memory systems is increasing. Considerable power loss is generated during the operation of these memory systems. This leads to temperature increases within the semiconductor chips.

Typically, the behavior of the semiconductor chip is affected by temperature increases. For example, in dynamic memory systems such as dynamic random access memory (DRAM) and synchronous dynamic random access memory (SDRAM), memory must be periodically refreshed in order to maintain the charges that represent the stored data. The frequency with which the memory must be refreshed varies with temperature. Consequently, the temperature within the semi-conductor chip must be sensed so that the appropriate refresh rate can be selected.

For low power or mobile or DRAM applications where decreasing current consumption is emphasized in order to increase battery life, various techniques are utilized in an attempt of minimize refresh operation, because it consumes significant current. One such technique is to ensure that the refresh rate does not occur more frequency than required to retain data in memory storage.

Consequently, many applications sense temperature changes in the memory chip so that adjustments can be made to the refresh rate as temperatures vary. For example, the lower the temperature of the device, the lower the refresh rate required to retain data. As the refresh rate is decreased additional power savings is enjoyed.

Various temperature sensing circuits have been employed to sense the temperature of devices in order to make adjustments to the refresh rate. One such circuit utilizes comparators that compare a sensed temperature to known values in order to determine the level of the sensed temperature. Since relatively small changes in sensed voltage translate to significant changes in temperature, even small amounts of error in these comparators lead to significant errors in sensed temperature. Consequently, an improved sensing circuit would be a useful improvement in the art.

SUMMARY

The present invention is a temperature sensing circuit, and method of using the same. A temperature sensing circuit includes a comparator, a temperature reference circuit and trimmer. The comparator is configured to receive a sense voltage that is indicative of a sensed temperature. The temperature reference circuit has a plurality of reference voltages coupled to the comparator such that the plurality of reference voltages are alternately compared to the sense voltage. The trimmer is coupled to the temperature reference circuit and is independently adjustable to adjust the plurality of reference voltages.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
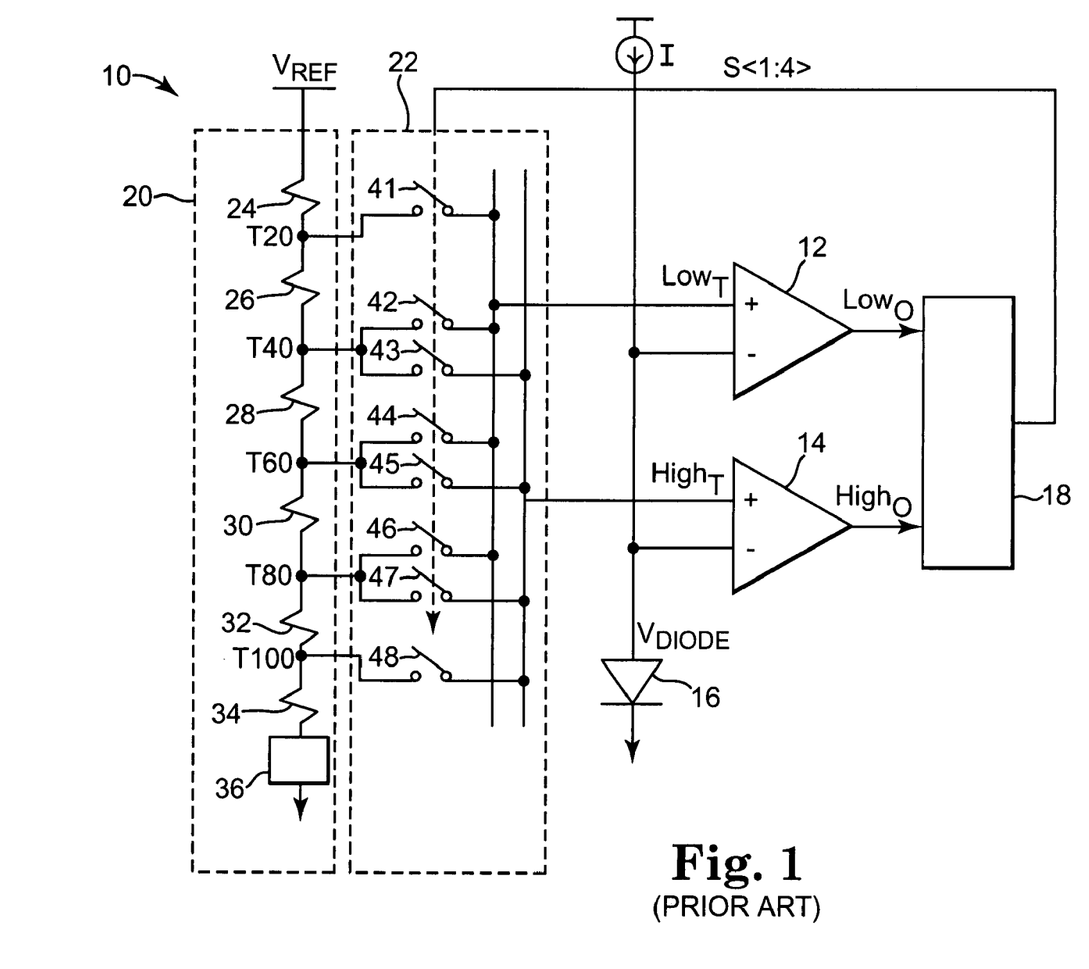
FIG. 1 illustrates a prior art temperature sensor circuit.

FIG. 1 illustrates prior art temperature sensor circuit 10. Temperature sensor circuit 10 includes low comparator 12, high comparator 14, sense diode 16, control logic 18, temperature reference network 20, and switch network 22. Sense diode 16 is configured to be placed in proximity to a location at which the temperature needs to be sensed. Sense diode 16 is further configured to have a diode voltage $V_{DIODE}$ that is changes with changes in temperature at the location proximate to diode 16. Typically, diode voltage $V_{DIODE}$ decreases with increases in temperature, and the decrease is fairly linear.

Both comparators 12 and 14 have a positive input, a negative input and an output. The negative inputs to both comparators 12 and 14 are tied to sense diode 16 and to a current source. The positive inputs of both comparators 12 and 14 are tied to switch network 22. The output of low comparator 12 (producing "$Low_O$" signal) and the output of high comparator 14 (producing "$High_O$" signal) are tied to control logic 18. Both $Low_O$ and $High_O$ signals are received by control logic 18. Control logic 18 is coupled to switch network 22. Control logic 18 produces first, second, third, and fourth control signals S1, S2, S3, and S4, which are received by switch network 22.

Switch network 22 include first, second, third, fourth, fifth, sixth, seventh and eighth switches 41–48. Temperature reference network 20 includes pull up resistor 24, first, second, third, and fourth reference resistors 26, 28, 30, and 32, pull down resistor 34, and trimmer 36.

The resistors in temperature reference network 20 are configured to form a plurality of nodes. Pull up resistor 24 is coupled to a reference voltage ($V_{REF}$). Pull up resistor 24 is then coupled to first resistor 26 to form node T20 therebetween. First resistor 26 and second resistor 28 are then coupled to form node T40 therebetween. Second resistor 28 and third resistor 30 are then coupled to form node T60 therebetween. Third resistor 30 and fourth resistor 32 are then coupled to form node T80 therebetween. Finally, pull down resistor 34 and fourth resistor 32 are coupled to form node T100 therebetween. Trimmer 36 is coupled to pull down resistor 34.

First through eighth switches 41–48 are coupled between the positive input terminals of low and high comparators 12 and 14 and temperature reference network 20. Specifically, first switch 41 is coupled between the positive input of low comparator 12 and node T20. Second switch 42 is coupled between the positive input of low comparator 12 and node T40. Third switch 43 is coupled between the positive input of high comparator 14 and node T40. Fourth switch 44 is coupled between the positive input of low comparator 12 and node T60. Fifth switch 45 is coupled between the positive input of high comparator 14 and node T60. Sixth switch 46 is coupled between the positive input of low comparator 12 and node T80. Seventh switch 47 is coupled between the positive input of high comparator 14 and node T80. Eighth switch 48 is coupled between the positive input of high comparator 14 and node T100.

Control logic 18 produces first, second, third, and fourth control signals S1, S2, S3, and S4, which control these first-eighth switches 41–48. In one embodiment, first control signal S1 controls sixth and eighth switches 46 and 48. Second control S2 controls fourth and seventh switches 44 and 47. Third control signal S3 controls second and fifth switches 42 and 45. Fourth control signal S4 controls first and third switches 41 and 43. When the control signal is "high", the switches controlled by that signal close, and when the control signal is "low", the switches controlled by that signal open.

In operation, the reference voltage $V_{REF}$ is internally generated and independent of voltage and temperature variation. The reference voltage $V_{REF}$ and the resistors of temperature reference network 20 provide multiple temperature reference voltages at nodes T20, T40, T60, T80, and T100. These reference voltages can be set to correspond to diode voltage $V_{DIODE}$ ($V_{T20}$, $V_{T40}$, $V_{T60}$, $V_{T80}$, and $V_{T100}$) at corresponding temperatures, 20 degrees, 40 degrees, 60 degrees, 80 degrees, and 100 degrees Celsius.

In operation, temperature sensor circuit 10 senses system or device temperature via sensing diode 16 by placing sensing diode 16 at or near the location where temperature is to be sensed. For example, temperature sensing circuit 10 may be implemented inside a DRAM chip, such that it is sensing the operating temperature of the DRAM chip. Diode voltage $V_{DIODE}$ then changes with changes in temperature at the location of sensing diode 16. Typically, diode voltage $V_{DIODE}$ decreases approximately two millivolts (mV) per one degree Celsius of temperature change. In addition, the voltage characteristic of the diode versus temperature is very linear.

Figure 2:
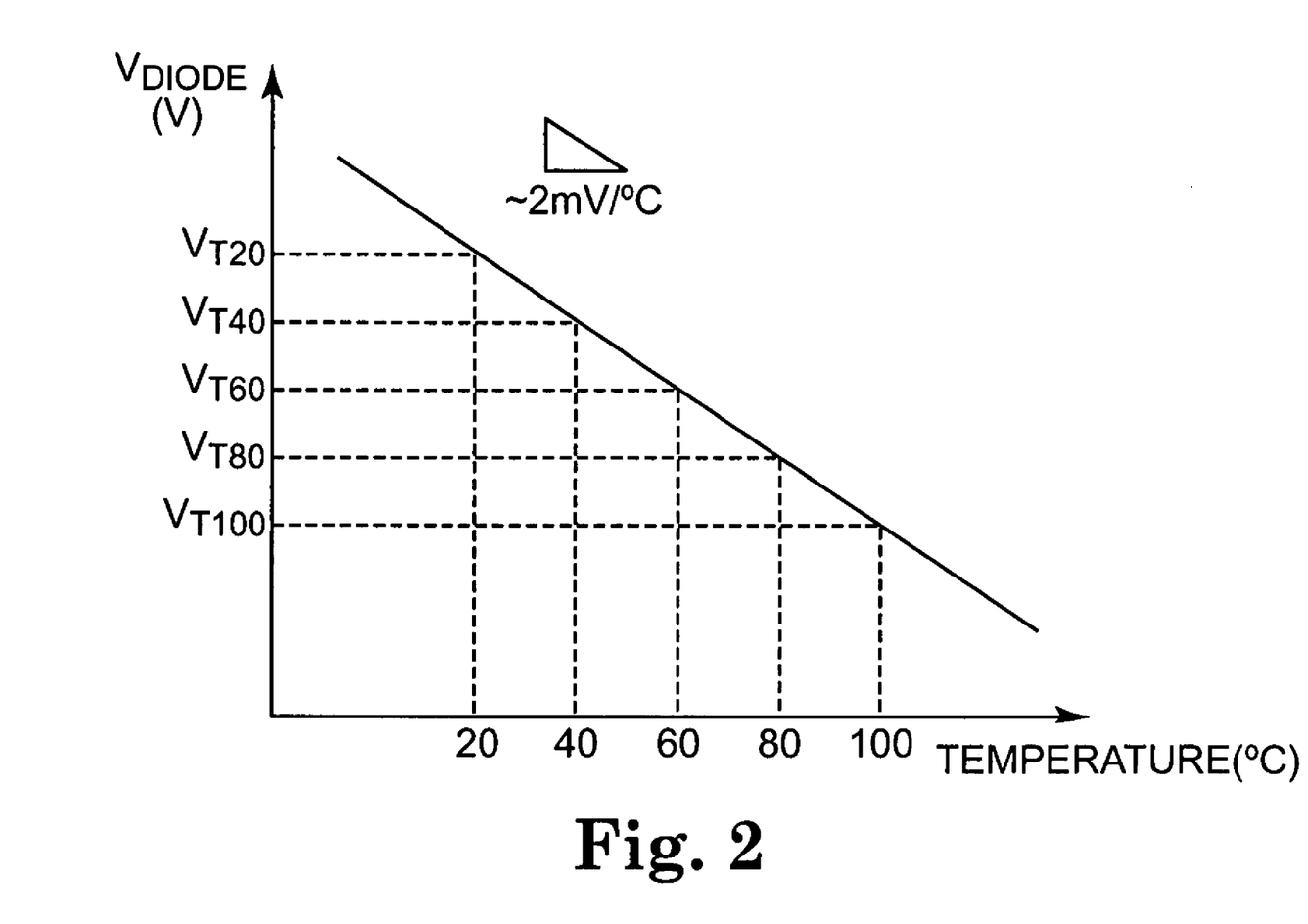
FIG. 2 is a graphic illustrating voltage relative to temperature.

FIG. 2 illustrates the linear relation between diode voltage and temperature for a sensing diode like diode 16. Consequently, once a diode with a particular technology is chosen, the corresponding diode voltages and temperatures can be easily determined. Thus, voltage values at each of 20 degrees, 40 degrees, 60 degrees, 80 degrees, and 100 degrees Celsius are associated with corresponding voltage values of sensing diode 16, $V_{T20}$, $V_{T40}$, $V_{T60}$, $V_{T80}$, and $V_{T100}$ as shown in FIG. 2.

Using the reference voltages at nodes T20, T40, T60, T80, and T100 in temperature reference network 20 and their known relationship to the sensed diode 16 voltages $V_{T20}$, $V_{T40}$, $V_{T60}$, $V_{T80}$, and $V_{T100}$, temperature sensing circuit 10 can be used to identify the temperature range for a location or device. In operation, sensing diode 16 is placed in proximity to the desired location at which a temperature needs to be sensed. The diode voltage $V_{DIODE}$ on sensing diode 16 is coupled to the negative input of low and high comparators 12 and 14. The diode voltage $V_{DIODE}$ is then compared against the reference voltages from temperature reference network 20 in accordance with control logic 18.

Figure 3:
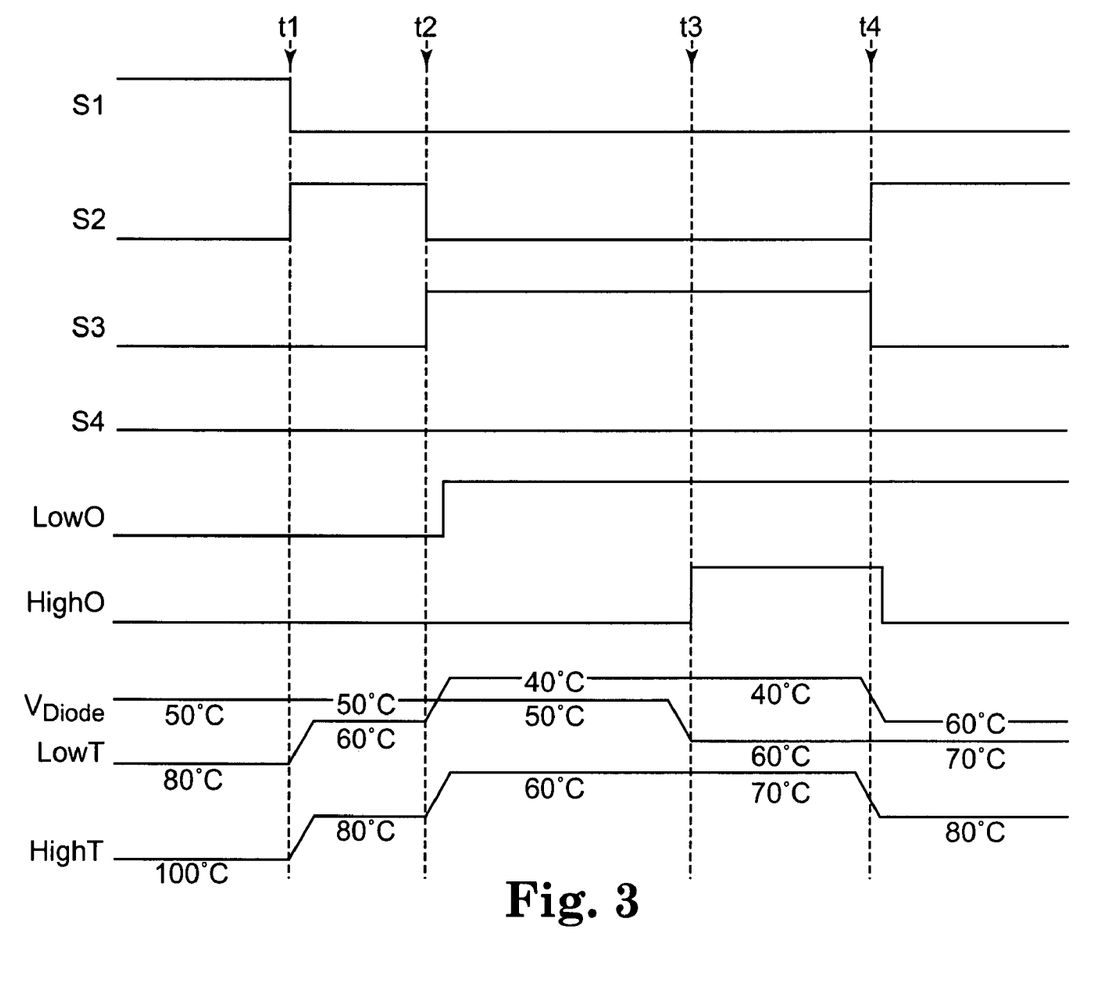
FIG. 3 illustrates timing signals for a temperature sensing circuit.

For example, temperature sensing circuit 10 is integrated in a DRAM chip such that sensing diode 16 is located at a place where temperature is desired to be measured. When sensing circuit 10 is initiated, the temperature at sensing diode is 50 degrees Celsius. Initially, control logic 18 sets first control signal S1 high and sets the remaining control signals, S2–S4, low. Since first control signal S1 controls sixth and eighth switches 46 and 48 and the S1 signal is high, switches 46 and 48 close. Since the remaining control signals S2–S4 are low, the remaining switches 41 and 43, 42 and 45, and 44 and 46 are all open. Thus, under these conditions the positive input of low comparator 12 is coupled to node T80 and the positive input to high comparator 14 is coupled to node T100. The voltage ($LOW_T$) at the positive input of low comparator 12 is compared with the diode voltage $V_{DIODE}$ and the voltage ($High_T$) at the positive input of high comparator 14 is compared with the diode voltage $V_{DIODE}$. Since the ambient temperature sensed by sense diode 16 is 50 degrees Celsius, diode voltage $V_{DIODE}$ higher relative to the $LOW_T$ and $High_T$ voltages, which are voltages based on temperatures of 80 and 100 degrees Celsius (voltages increase with lower temperature). Thus, the output ($Low_O$) of low comparator 12 and output ($High_O$) of high comparator 14 are low. The waveforms that illustrate these conditions are illustrated in FIG. 3 before time t1.

Next, control logic 18 changes control signals such that second control signal S2 transitions to high and remaining control signals S1, S3, and S4 transition to low at time t1. With second control signal S2 high, switches 44 and 47 close. With each of the remaining control signals S1, S3 and S4 low all of the other switches 41 and 43, 42 and 47, and 46 and 48 are open. Thus, under these conditions the positive input of low comparator 12 is coupled to node T60 and the positive input of high comparator 14 is coupled to node T80. Again, the voltage ($Low_T$) at the positive input of low comparator 12 is compared with the diode voltage $V_{DIODE}$ and the voltage ($High_T$) at the positive input of high comparator 14 is compared with the diode voltage $V_{DIODE}$. Since the ambient temperature sensed by sense diode 16 is 50 degrees Celsius, diode voltage $V_{DIODE}$ higher relative to the $Low_T$ and $High_T$ voltages, which are voltages based on temperatures of 60 and 80 degrees Celsius. Thus, the output ($Low_O$) of low comparator 12 and output ($High_O$) of high comparator 14 are low. The waveforms that illustrate these conditions are shown in FIG. 3 between time t1 and time t2.

Next, control logic 18 changes control signals such that third control signal S3 transitions high and the remaining control signals transition low at time t2. With third control signal S3 high, switches 42 and 45 close. With each of the remaining control signals S1, S2, and S4 low, switches 46 and 48, 44 and 47, and 41, and 43 are open. Thus, under these conditions the positive input of low comparator 12 is coupled to node T40 and the positive input of high comparator 14 is coupled to node T60. Again, the voltage (Low$_T$) at the positive input of low comparator 12 is compared with the diode voltage V$_{DIODE}$ and the voltage (High$_T$) at the positive input of high comparator 14 is compared with the diode voltage V$_{DIODE}$. Since the ambient temperature sensed by sense diode 16 is 50 degrees Celsius, diode voltage V$_{DIODE}$ is higher relative to the High$_T$ voltage, which is a voltage based on a temperature of 60 degrees Celsius. Thus, the output (High$_O$) of high comparator 14 is low. However, diode voltage V$_{DIODE}$ is lower relative to the Low$_T$ voltage, which is a voltage based on a temperature of 40 degrees Celsius. Thus, the output (Low$_O$) of low comparator 12 transitions high. This indicates to control logic 18 that since the diode voltage V$_{DIODE}$ is between the reference voltages T40 and T60, the temperature at sense diode 16 is between 40 and 60 degrees Celsius. The waveforms that illustrate these conditions are illustrated in FIG. 3 between time t2 and time t3.

Next, the ambient temperature sensed by diode sensor 16 changes from 50 to 70 degrees Celsius at time t3, but all control signals S1–S4 remain unchanged. Under these conditions diode voltage V$_{DIODE}$ is lower relative to the High$_T$ voltage, which is a voltage based on a temperature of 60 degrees Celsius, and also lower relative to the Low$_T$ voltage, which is a voltage based on a temperature of 40 degrees Celsius. Thus, the output (High$_O$) of high comparator 14 transitions high and the output (Low$_O$) of low comparator 12 remains high. This indicates to control logic 18 that the diode voltage V$_{DIODE}$ is no longer within the reference voltages T40 and T60. The waveforms that illustrate these conditions are illustrated in FIG. 3 between time t3 and time t4.

Finally, control logic 18 changes control signals such that second control signal S2 transitions to high and remaining control signals S1, S3, and S4 transition to low at time t1. With second control signal S2 high, switches 44 and 47 close. With each of the remaining control signals S1, S3 and S4 low all of the other switches 41 and 43, 42 and 47, and 46 and 48 are open. Thus, under these conditions the positive input of low comparator 12 is coupled to node T60 and the positive input of high comparator 14 is coupled to node T80. Again, the voltage (Low$_T$) at the positive input of low comparator 12 is compared with the diode voltage V$_{DIODE}$ and the voltage (High$_T$) at the positive input of high comparator 14 is compared with the diode voltage V$_{DIODE}$. Since the ambient temperature sensed by sense diode 16 is now 70 degrees Celsius, diode voltage V$_{DIODE}$ is higher relative to the High$_T$ voltage, which is a voltage based on a temperature of 80 degrees Celsius. Thus, the output (High$_O$) of high comparator 14 transitions low. However, diode voltage V$_{DIODE}$ is lower relative to the Low$_T$ voltage, which is a voltage based on a temperature of 60 degrees Celsius. Thus, the output (Low$_O$) of low comparator 12 remains high. This indicates to control logic 18 that since the diode voltage V$_{DIODE}$ is between the reference voltages T60 and T80, the temperature at sense diode 16 is between 60 and 80 degrees Celsius. The waveforms that illustrate these conditions are illustrated in FIG. 3 after time t4.

Trimmer 36 in temperature reference network 20 is used to adjust each of the voltage reference levels at nodes T20, T40, T60, T80, and T100 of temperature reference network 20 when the voltage V$_{DIODE}$ of sense diode 16 deviates from a target value. One important effect that causes the V$_{DIODE}$ of sense diode 16 to vary from a target value is input offset voltage of low and high comparators 12 and 14. Input offset voltage is an imbalance caused by a mismatch of transistors that make up the comparators. Input offset voltage is mainly caused by process effect and a small voltage must be applied to the input in order to "trim out" or balance the offset voltage in the comparators. This is accomplished with trimmer 36. Trimmer 36 may be a variable resistor such as a potentiometer or is comprised of a plurality of resistors that can be added to or removed, such as be blowing fuses, from trimmer 36 to adjust its effective resistance.

The input offset voltage can have a significant affect on the accuracy of temperature sensing circuit 10. Typically, the input offset voltage may be in the range of plus or minus 10 mV. This type of offset can correspond to an error as large as 5 degrees Celsius. Consequently, the input offset voltage must be removed or minimized in order to have a highly accurate temperature sensor.

The limitation of temperature sensor circuit 10 is that there is no way to individually or independently trim the input offset voltage of low and high comparators 12 and 14. If the input offset voltages of low and high comparators 12 and 14 are not in the same direction, that is, not of the same polarity, there is no way to adjust the input offset voltages with trimmer 36. For example, if the input offset voltage for low comparator 12 is positive 10 mV, and the input offset voltage for high comparator 14 is negative 10 mV, trimmer 36 cannot be adjusted to balance the input offset voltages.

Figure 4:
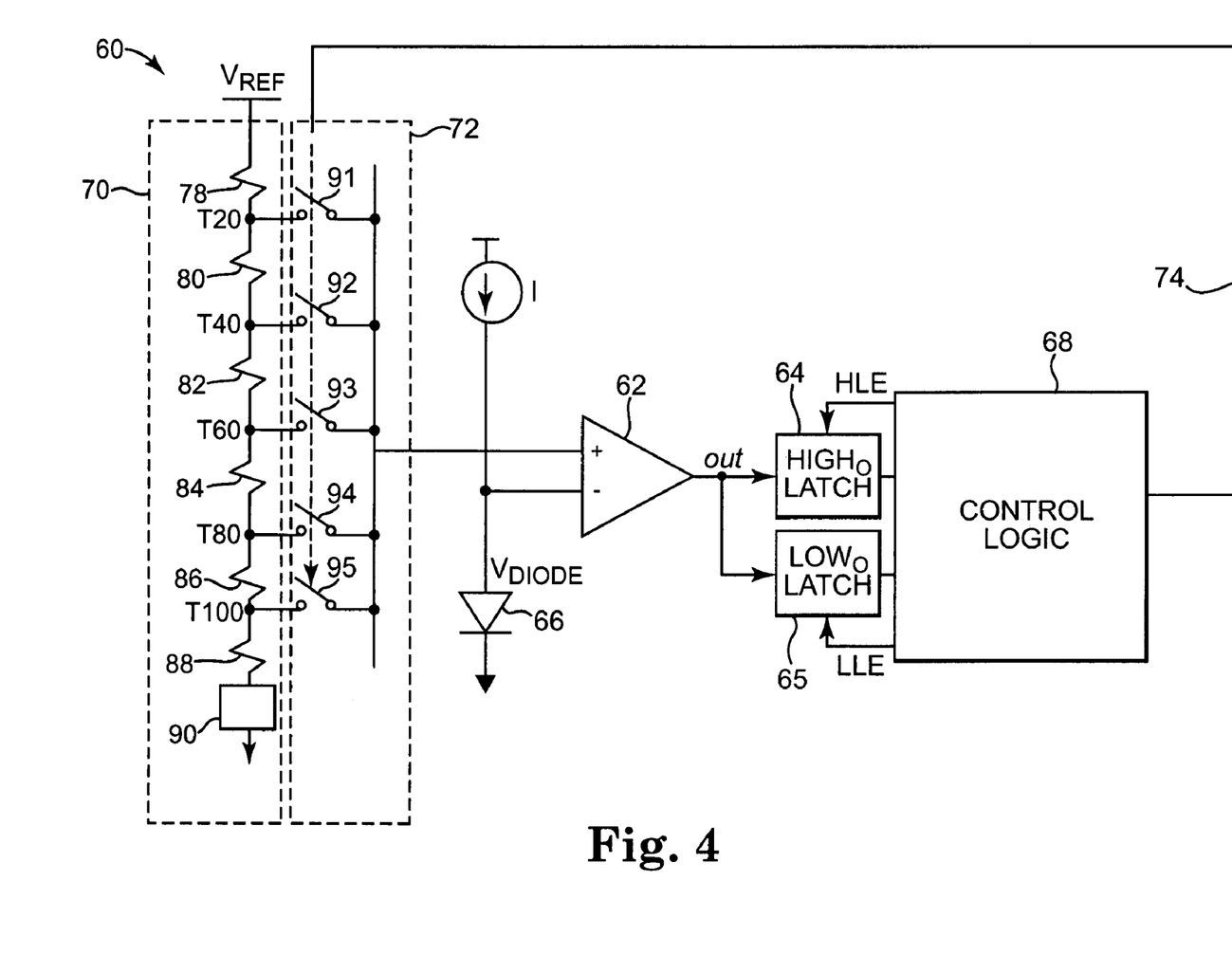
FIG. 4 illustrates a temperature sensor circuit in accordance with the present invention.

FIG. 4 illustrates temperature sensor 60 in accordance with the present invention. Temperature sensor circuit 60 includes a single comparator 62, high$_O$ latch 64, low$_O$ latch 65, sense diode 66, control logic 68, temperature reference network 70, and switch network 72. Temperature sensor circuit 60 is configured to accurately sense temperature and is configured with a single comparator such that it may be independently adjustable for input offset voltage.

Comparator 62 has a positive input, a negative input and an output. The negative input to comparator 62 is tied to sense diode 66 and to a current source I. The positive input of comparator 62 is tied to switch network 72. The output of comparator 62 is coupled to high$_O$ latch 64 and to low$_O$ latch 65.

Control logic 68 is coupled between high$_O$ and low$_O$ latches 64 and 65 and switch network 72. Control logic 68 produces a plurality of control signals. High latch enable (HLE) control signal controls the latching of high$_O$ latch 64, and low latch enable (LLE) control signal controls the latching of low$_O$ latch 65. Control signals are also sent to switch network 72 via switch control line 74 to control switching within switch network 72.

Switch network 72 includes first, second, third, fourth and fifth switches 91–95. Temperature reference network 70 includes pull up resistor 78, first, second, third, and fourth reference resistors 80, 82, 84, and 86, pull down resistor 88, and trimmer 90.

The resistors in temperature reference network 70 are configured to form a plurality of nodes. Pull up resistor 78 is coupled to a reference voltage (V$_{REF}$). Pull up resistor 78 is then coupled to first resistor 80 to form node T20 of temperature reference network 70 between resistors 78 and 80. First resistor 80 and second resistor 82 are then coupled to form node T40 between resistors 80 and 82. Second resistor 82 and third resistor 84 are then coupled to form node T60 between resistors 82 and 84. Third resistor 84 and fourth resistor 86 are then coupled to form node T80 between resistors 84 and 86. Finally, pull down resistor 88 and fourth resistor 86 are coupled to form node T100 between resistors 86 and 88. Trimmer 90 is coupled to pull down resistor 88.

In one embodiment, the reference voltage $V_{REF}$ is internally generated and independent of voltage and temperature variation. The reference voltage $V_{REF}$ and the resistors of temperature reference network 72 provide multiple temperature reference voltages at nodes T20, T40, T60, T80, and T100. These reference voltages can be set to correspond to diode voltage $V_{DIODE}$ ($V_{T20}$, $V_{T40}$, $V_{T60}$, $V_{T80}$, and $V_{T100}$) at corresponding temperatures, 20 degrees, 40 degrees, 60 degrees, 80 degrees, and 100 degrees Celsius. Temperature reference voltages at nodes T20, T40, T60, T80 and T100 in temperature reference network 70 are made available to comparator 62. These voltages may then be compared to diode voltage $V_{DIODE}$ at sense diode 66.

First through fifth switches 91–95 of first switch network 72 are coupled between the positive input terminal of comparator 62 and temperature reference network 70. Specifically, first switch 91 of first switch network 72 is coupled between the positive input of comparator 62 and node T20. Second switch 92 is coupled between the positive input of comparator 92 and node T40. Third switch 93 is coupled between the positive input of comparator 62 and node T60. Fourth switch 94 is coupled between the positive input of comparator 62 and node T80. Fifth switch 95 is coupled between the positive input of comparator 62 and node T100. Switch network 72 could have a variety of other embodiments consistent with the present invention. For example, the network could be part of a processor or other controller.

In one embodiment, control logic 68 controls first through fifth switches 91–95 via control signals sent over control line 74. Control logic 68 also controls high$_O$ latch 64 with HLE signals and low$_O$ latch 65 with LLE signal. In this way, temperature sensor circuit 60 is utilized to accurately sense temperature at sense diode 66 using only a single comparator 62 such that adjustment may be made for any input offset voltage via trimmer 90, thereby providing accurate temperature sensing.

In one embodiment, control logic 68 produces first, second, third, fourth and fifth control signals S1, S2, S3, S4 and S5, which control first-fifth switches 91–95 in switch network 72. In one embodiment, first control signal S1 controls first switch 91 in first switch network 72, second control signal S2 controls second switch 92 in first switch network 72, third control signal S3 controls third switch 93 in first switch network 72, fourth control signal S4 controls fourth switch 94 in first switch network 72, and fifth control signal S5 controls fifth switch 95 in first switch network 72. When the control signal is "high", the switches controlled by that signal close, and when the control signal is "low", the switches controlled by that signal open.

In one embodiment, temperature sensor circuit 60 senses system or device temperature via sense diode 66 by placing sense diode 66 at or near the location where temperature is to be sensed. For example, temperature sensing circuit 60 may be implemented inside a DRAM chip, such that it is sensing the operating temperature of the DRAM chip. Diode voltage $V_{DIODE}$ then changes with changes in temperature at the location of sense diode 66. Accordingly, the refresh rate in the DRAM chip can be adjusted with changes in sensed temperature.

As described previously, there is a linear relation between diode voltage and temperature for a sensing diode like sense diode 66. Consequently, once a diode with a particular technology is chosen, the corresponding diode voltages and temperatures can be easily determined. Thus, voltage values at each of 20 degrees, 40 degrees, 60 degrees, 80 degrees, and 100 degrees Celsius are associated with corresponding voltage values of sense diode 66, $V_{T20}$, $V_{T40}$, $V_{T60}$, $V_{T80}$, and $V_{T100}$.

Using the reference voltages at nodes T20, T40, T60, T80, and T100 in temperature reference network 70 and their known relationship to the sense diode 66 voltages $V_{T20}$, $V_{T40}$, $V_{T60}$, $V_{T80}$, and $V_{T100}$, temperature sensing circuit 60 can be used to identify the temperature range for a location or device. In one embodiment, sense diode 66 is placed in proximity to the desired location at which a temperature needs to be sensed. The diode voltage $V_{DIODE}$ on sense diode 66 is coupled to the negative input of comparator 62. The diode voltage $V_{DIODE}$ is then compared against the reference voltages from temperature reference network 60 in accordance with control logic 68 such that the temperature range at sense diode 66 is determined.

Figure 5:
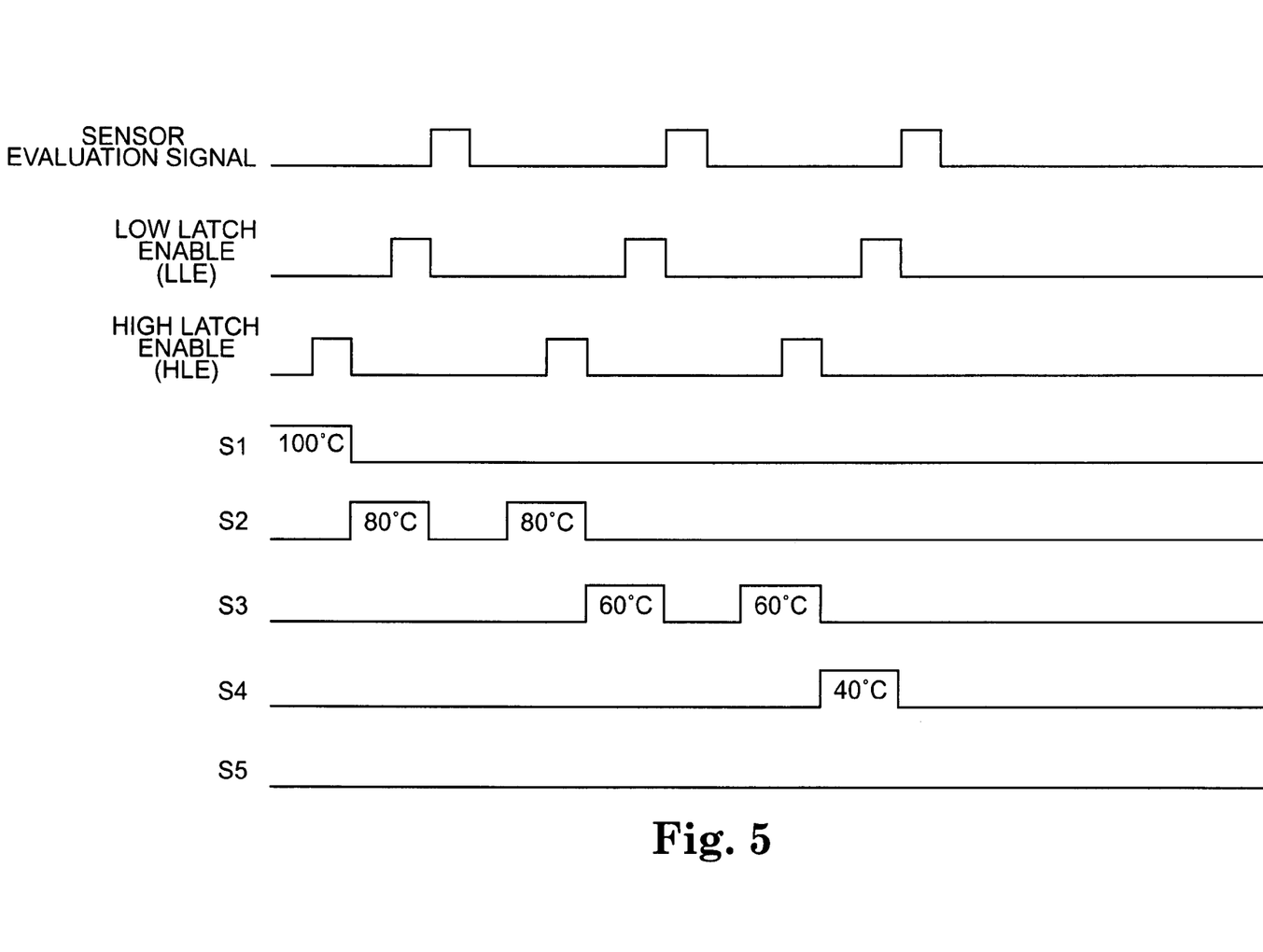
FIG. 5 illustrates timing signals for a temperature sensing circuit in accordance with the present invention.

One example of temperature sensor circuit 60 is illustrated by the timing signals illustrated in FIG. 5, with reference made to FIG. 4. In the example, temperature sensing circuit 60 is integrated in a DRAM chip such that sense diode 66 is located at a place where temperature is desired to be measured. When sensing circuit 60 is initiated, the temperature at sense diode 66 is 50 degrees Celsius.

Initially, control logic 68 sets fifth control signal S5 high and remaining first through fourth signals S1–S4 are set low over line 74 to switch network 72. This closes fifth switch 95 and opens remaining switches 91–94 such that the positive input of comparator 62 is coupled to node T100. The diode voltage $V_{DIODE}$ is compared against T100 and the result is latched into high$_O$ latch 64 with HLE signal from control logic 68. Next, control logic 68 sets fourth control signal S4 high and remaining signals S1–S3 and S5 are set low. This closes fourth switch 94 and opens remaining switches 91–93 and 95 such that the positive input of comparator 62 is coupled to node T80. The diode voltage $V_{DIODE}$ is compared against T80 and the result is latched into low$_O$ latch 65 with LLE signal from control logic 68. Control logic 68 then compares the results in the latches with a sensor output evaluation signal and determines whether the diode voltage $V_{DIODE}$ is in the expected range (T100–T80). In the example, since sense diode 66 is proximate to a temperature of 50 degrees C., the diode voltage $V_{DIODE}$ is not in the range.

Thus, control logic 68 sets fourth control signal S4 high and remaining signals S1–S3 and S5 are set low. This closes fourth switch 94 and opens remaining switches 91–93 and 95 such that the positive input of comparator 62 is coupled to node T80. The diode voltage $V_{DIODE}$ is compared against T80 and the result is latched into high$_O$ latch 64 with HLE signal from control logic 68. Next, control logic 68 sets third control signal S3 high and remaining signals S1–S2 and S4–S5 are set low. This closes third switch 93 and opens remaining switches 91–92 and 94–95 such that the positive input of comparator 62 is coupled to node T60. The diode voltage $V_{DIODE}$ is compared against T60 and the result is latched into low$_O$ latch 65 with LLE signal from control logic 68. Control logic 68 then compares the results in high$_O$ and low$_O$ latches 64 and 65 with the sensor output evaluation signal and determines whether the diode voltage $V_{DIODE}$ is in the expected range (T80–T60). Again, with the temperature of 50 degrees C., the diode voltage $V_{DIODE}$ is not in the range.

Thus, control logic 68 sets third control signal S3 high and remaining signals S1–S2 and S4–S5 are set low. This closes third switch 93 and opens remaining switches 91–92 and 94–95 such that the positive input of comparator 62 is coupled to node T60. The diode voltage $V_{DIODE}$ is compared against T60 and the result is latched into high$_O$ latch 64 with HLE signal from control logic 68. Next, control logic 68 sets second control signal S2 high and remaining signals S1 and S3–S5 are set low. This closes second switch 92 and opens remaining switches 91 and 93–95 such that the positive input of comparator 62 is coupled to node T40. The diode voltage $V_{DIODE}$ is compared against T40 and the result is latched into low$_O$ latch 65 with LLE signal from control logic 68. Control logic 68 then compares the results in high$_O$ and low$_O$ latches 64 and 65 with the sensor output evaluation signal and determines whether the diode voltage $V_{DIODE}$ is in the expected range (T60–T40). Since the temperature of 50 degrees C. is in the range, the proper temperature is identified.

Temperature sensing circuit 60 includes temperature reference network 70, which has trimmer 90. Trimmer 90 in temperature reference network 70 is used to adjust each of the voltage reference levels at nodes T20, T40, T60, T80, and T100 of first temperature reference network 70 in order to balance or adjust the input offset voltage at comparator 62. In one embodiment, trimmer 90 is a variable resistor, such as potentiometer, and in another embodiment trimmer 90 is a plurality of resistors that can be added to or removed from trimmer 90 to adjust the effective resistance. In one embodiment, resistors in trimmer 90 can be removed by blowing fuses. As a result, the input offset voltage at comparator 62 individually balanced by adjusting trimmer 90 in order to have a highly accurate temperature sensor.

With temperature sensing circuit 60, since there is only a single comparator with its own temperature reference network having its own trimmer, input offset voltage of comparator 62 can be individually or independently trimmed. Thus, there will not be situations where the polarity of the input offset voltages is at issue, since there is only a single comparator 62 and trimmer 90 allow for independent adjustment. With such a configuration, temperature sensing circuit 60 is a highly accurate temperature sensor.

Temperature sensing circuit 60 can be used in a variety of applications to provide accurate temperature sensing. For example, temperature sensing circuit 60 can be placed within a DRAM chip such that the temperature of the DRAM can be accurately measured and adjustments made accordingly. For example, the refresh rate of the DRAM system can be set relatively low when the DRAM is operating at lower temperatures, such as room temperature. Then, as temperature sensing circuit 60 detects that temperature is increasing, the refresh rate can be correspondingly increased to ensure data is retained. Allowing for lower refresh rates at lower temperatures will decrease the power consumed in the memory.

Although specific embodiments have been illustrated and described herein, it will be appreciated by those of ordinary skill in the art that a variety of alternate and/or equivalent implementations may be substituted for the specific embodiments shown and described without departing from the scope of the present invention. For example, sense diode 66 is illustrated in the present invention as a diode, but one skilled in the art will recognize that a bipolar junction transistor (BJT), or other similar device, can be used to accomplish the advantages of the present invention. This application is intended to cover any adaptations or variations of the specific embodiments discussed herein. Therefore, it is intended that this invention be limited only by the claims and the equivalents thereof.

What is claimed is:

1. A random access memory device including a temperature sensing circuit, the temperature sensing circuit comprising:
   a sensing device configured to hold a sensed voltage that varies with changes in temperature;
   a temperature reference circuit having a plurality of reference voltages;
   a switch circuit coupled to the temperature reference circuit;
   a comparator having a first input, a second input, and an output, the comparator configured to receive the sensed voltage from the sensing device on its first input and configured to receive the reference voltages on its second input, and configured to produce comparison signals at its output;
   first and second latches configured to latch and hold the comparison signals from the comparators; and
   a control circuit coupled to switch circuit and to the first and second latches, wherein the control circuit controls the switch circuit such that reference voltages are selectively applied to the first input to the comparator and wherein the control circuit selectively controls the first and second latches to hold the comparison signals.

2. The random access memory device of claim 1 further comprising a trimmer coupled to the first temperature reference circuit.

3. The random access memory device of claim 2 wherein the trimmer is adjustable to correct the reference voltages for input offset voltage in the comparator.

4. The random access memory device of claim 2 wherein the trimmer is a potentiometer with adjustable resistance to correct for input offset voltage in the comparator.

5. The random access memory device of claim 2 wherein the trimmer is multiple resistors that may be removed and added to the trimmer in order to provide adjustable resistance to correct for input offset voltage in the comparator.

6. A temperature sensing circuit comprising:
   a comparator configured to receive a sense voltage that is indicative of a sensed temperature;
   a temperature reference circuit coupled to the comparator, the temperature reference network having a plurality of reference voltages including at least a first and a second reference voltage; and
   a control circuit coupled to the temperature reference circuit such that the control circuit controls alternately compares the plurality of reference voltages to the sense voltage, the control circuit further configured to receive a plurality of outputs from the comparator indicative of the comparisons of the plurality of the reference voltages to the sense voltage and wherein the control circuit determines when the sense voltage is between the first and the second reference voltages.

7. The temperature sensing circuit of claim 6 further comprising a trimmer coupled to the temperature reference circuit that is independently adjustable to adjust the plurality of reference voltages.

8. The temperature sensing circuit of claim 7 wherein the trimmer is a potentiometer with adjustable resistance to correct for input offset voltage in the comparator.

9. The temperature sensing circuit of claim 7 wherein trimmer is multiple resistors that may be removed and added to the trimmer in order to provide adjustable resistance to correct for input offset voltage in the comparator.

10. The temperature sensing circuit of claim 6 further including a sensing device configured to sense the sensed voltage that varies with changes in temperature at the sensing device and that provides the sensed voltage to a first input of the comparator.

11. The temperature sensing circuit of claim 10 further comprising a switch circuit coupled between the temperature reference circuit and a second input of the comparator and controlled by the control circuit such that the plurality of reference voltages are alternately applied to the second input and compared to the sense voltage by opening and closing switches in the switch circuit.

12. The temperature sensing circuit of claim 11 wherein the control circuit further comprises first and second latches coupled to an output of the comparator such that the first latch holds a first comparison signal representative a first comparison of the first reference voltage with the sense voltage and such that the second latch holds a second comparison signal representative a second comparison of the second reference voltage with the sense voltage.

13. The temperature sensing circuit of claim 12 wherein the control circuit receives the first and second comparison signal to determine whether the sense voltage is between the first and second reference voltage.

14. The temperature sensing circuit of claim 13 wherein the control circuit controls the switch circuit to alternately apply third and fourth reference voltages to the second input of the comparator and controls the first and second latches such that the first latch holds a third comparison signal representative a comparison of the third reference voltage with the sense voltage and such that the second latch holds a fourth comparison signal representative a comparison of the fourth reference voltage with the sense voltage.

15. The temperature sensing circuit of claim 14 wherein the control circuit receives the third and fourth comparison signal to determine whether the sense voltage is between the third and fourth reference voltage.

16. The temperature sensing circuit of claim 6 configured in a random access memory device.

17. A method of sensing temperature, the method comprising:
sensing the temperature of a semiconductor device with a temperature sensing circuit and producing a corresponding sensed temperature voltage;
providing the sensed temperature voltage to a single comparator;
providing a first reference voltage to the single comparator;
comparing the sensed temperature voltage with the first reference voltage to produce a first comparison result;
latching the first comparison result from the single comparator;
providing a second reference voltage to the single comparator;
comparing the sensed temperature voltage with the second reference voltage to produce a second comparison result;
latching the second comparison result from the single comparator; and
determining from the first and second latched comparison results whether the sensed temperature voltage is within the first and second reference voltages, and on the basis of the first and second latched comparison results, outputting a temperature range for the semiconductor device.

18. The method of claim 17 further including adjusting the first and second reference voltages to balance any input offset voltage from the single comparator.

19. The method of claim 18 wherein the adjusting the first and second reference voltages is done with a trimmer.

20. The method of claim 17 further including providing additional reference temperatures when the sensed temperature voltage is not between the first and second reference voltages.

21. A temperature sensing circuit comprising:
a comparator configured to receive a sense voltage that is indicative of a sensed temperature;
switch means coupled to the comparator for alternately comparing a first and second reference voltages with the sense voltage to produce first and second comparison results;
latch means coupled to the comparator for holding first and second comparison results;
control means for determining from the first and second comparison results whether the sense voltage is between first and second reference voltages;
a reference network for providing the first and second reference voltages; and
trimmer means coupled to the reference network for independently adjusting the first and second reference voltages.

* * * * *